United States Patent [19]
Bahler et al.

[11] 3,837,008
[45] Sept. 24, 1974

[54] ENDO-PROSTHESIS FOR A WRIST JOINT

[75] Inventors: Andre Bahler; Norber Gschwend; Heinrich Scheier, all of Zurich, Switzerland

[73] Assignee: Sulzer Brothers Ltd., Winterthur, Switzerland

[22] Filed: Aug. 31, 1972

[21] Appl. No.: 285,133

[30] Foreign Application Priority Data
Sept. 6, 1971  Switzerland.................. 13014/71

[52] U.S. Cl............................ 3/1, 128/92 C, 3/12.4, 46/173
[51] Int. Cl............................................. A61f 1/24
[58] Field of Search.......................... 3/1, 12–12.5, 3/31, 32; 128/92 C, 92 CA, 92 R; 46/161, 173; 287/12, 21, 87

[56] References Cited
UNITED STATES PATENTS
| | | |
|---|---|---|
| 2,422,302 | 6/1947 | Horn.................................. 3/12.4 |
| 2,649,806 | 8/1953 | Monaghan......................... 46/173 |
| 3,506,982 | 4/1970 | Steffee................................... 3/1 |
| 3,638,243 | 2/1972 | Campbell et al...................... 3/1 |

FOREIGN PATENTS OR APPLICATIONS
| | | |
|---|---|---|
| 599,365 | 10/1959 | Italy................................. 3/32 |

Primary Examiner—Richard A. Gaudet
Assistant Examiner—Ronald L. Frinks
Attorney, Agent, or Firm—Kenyon & Kenyon Reilly Carr & Chapin

[57] ABSTRACT

The wrist joint prosthesis is formed of a spherical head and a two-part socket. The socket allows the head and attached shaft to move via at least one appendage within a guideway parallel to the mating plane of the socket parts while also allowing the head and shaft to move transversely of the socket within mouthlike openings in the socket parts.

11 Claims, 8 Drawing Figures

PATENTED SEP 24 1974        3,837,008
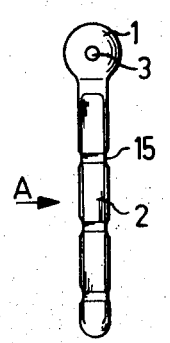
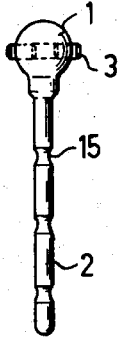
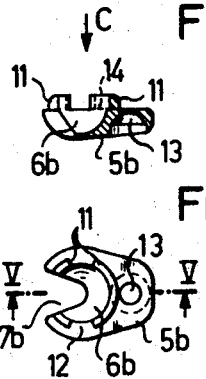
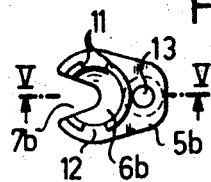
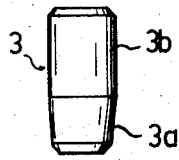
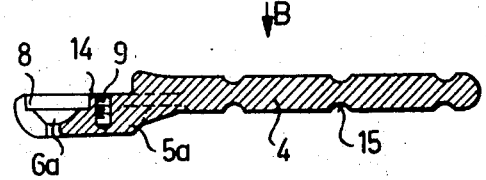
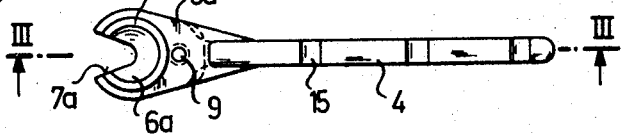
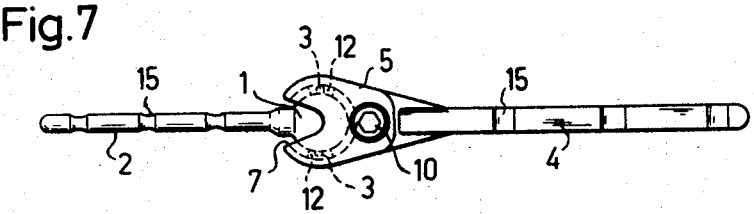

ENDO-PROSTHESIS FOR A WRIST JOINT

This invention relates to an endo-prosthesis for a wrist joint.

In constructing endo-joint or implantation joint prosthesis, there are two important requirements, among others, which have to be met from the medical point of view. In the first place, the motion of the prosthesis must correspond to that of the natural joint as far as possible to avoid unnatural overloading of other parts of the body and organs through a false progress of movements or through a false location of the joint point. Secondly, the situs of the insertion and the seating of the prosthesis parts into the bone forming the natural joint should be obtainable with the least possible injury to that bone. That is, only the absolute minimum of bone material should be removed in order to permit placement of the prosthesis.

In the case of a prosthesis for the human hand, an analysis of the possible movements of the hand shows that, in any desired position that can be reached through a rotation about an assumed middle axis of the forearm, a relatively great angular rotation must be possible about the two axes perpendicular to the forearm axis, if great similarity to the movements of the natural wrist joint is to be obtained.

Accordingly, it is an object of the invention to achieve extensive movement in the case of a wrist-joint prosthesis.

It is another object of the invention to provide an endo-prosthesis for a wrist joint which is simple to manufacture.

It is another object of the invention to provide a wrist joint prosthesis which is relatively simple to implant and which requires a minimal amount of bone removal to implant.

Briefly, the invention provides an endo-prosthesis for a wrist joint which includes a spherical head and a spherical socket receiving the head. The socket is formed by two half parts which are detachably secured to each other about the head and which are each formed with a mouthlike opening at one edge. Both openings are aligned with each other.

One particular dificulty in the case of a wrist joint prosthesis has been that with the natural hand, the rotation about an axis extending in the direction of the forearm occurs not in the wrist joint itself but by means of a turning of spoke and ell relative to one another, i.e., with the forearm. Accordingly, the invention prevents the spherical head from rotating in this fashion within the spherical socket about an axis extending in the direction of the forearm as the natural hand lacks the ligaments and muscles required to prevent such an occurrence. This is accomplished by providing the spherical head with at least one appendage which extends radially therefrom in a direction disposed perpendicularly to the axis of a shaft on which the head is mounted and by providing the socket with a slitlike guide in the peripheral direction which receives the appendage so that the appendage is able to move in the peripheral direction parallel to a dividing plane between the half parts forming the socket and is able to turn about the diameter of the head aligned with the appendage. The appendage is advantageously a body of revolution, in particular, a circular cylinder or a spherical shape.

The formation of the guideway is simply done by forming a recess in at least one socket half part in the dividing plane between the socket parts to annularly surround the bearing surface of the part and by positioning at least one abutment within the recess to limit the motion of the head in the peripheral direction. This abutment can be formed of at least one raised rim-part on the other socket half that engages in the annular recess. It is moreover advantageous if, as measured in the dividing plane, the opening angle of the slitlike guideway, limited by abutments, is smaller than that of the mouthlike opening at the front of the socket.

These and other objects and advantages of the invention will become more apparent from the following detailed description and appended claims taken in conjunction with the accompanying drawings in which:

FIG. 1 illustrates a spherical head of a prosthesis according to the invention that can be anchored in a wrist bone;

FIG. 1a illustrates an enlarged scale, an appendage that is secured in the spherical head;

FIG. 2 illustrates a side view of FIG. 1 taken in the direction of arrow A;

FIG. 3 illustrates a view taken on line II—II of FIG. 4 of a part of the spherical socket which is to be fastened into the spoke of a forearm;

FIG. 4 illustrates a view in the direction of the arrow B of FIG. 3;

FIG. 5 illustrates a cross-sectional view of the second part of the socket taken on line V—V of FIG. 6;

FIG. 6 illustrates a view of the socket part of FIG. 5 taken in the direction of arrow C in FIg. 5; and FIG. 7 illustrates a view of the assembled prosthesis wherein the position of the hand is assumed to be such that the central axis of the prosthesis extends as a rectilinear extension of the hypothetical middle axis of the forearm.

Referring to FIGS. 1 and 2, the spherical head 1 is attached to a shaft 2 whose cross-section is rectangular with rounded-off corners, and which serve to anchor the head in a middle hand-bone. In order to improve anchorage, the shaft 2 has transverse grooves 15 into which a suitable cement can enter during cementing into the bone. In addition, two appendages 3 are inserted into the head 1 at opposite points perpendicularly to the axis defined by the shaft 2 and on a diameter of the ballhead 1.

As shown in FIG. 1a, each appendage consists of a tapered part 3a, inserted into the spherical head and of a rollerlike part 3b that extends partly out of the head surface. Alternatively, the appendage or appendages 3 may be of some other form, for example, be made as balls or other spherical shapes.

Referring to FIGS. 3 and 4, the socket 5 is formed, in part, of a half part 5a which is mounted on a shaft 4 of rectangular cross-section with rounded-off corners and transverse grooves 15. This part 5a also has a central hemispherical bearing surface 6a, adapted to the form and dimensions of the spherical head 1, which receives the head 1 so that the head 1 can turn in all directions. Diametrically opposite the shaft 4, the lower part 5a has a mouthlike opening 7a whose angle in a dividing plane 14 in the horizontal direction on the middle plane defined by the shaft 4, amounts to approximately ±20°, while the opening angle perpendicular of the dividing plane 14 is about 70° in the downward direction. The holllow-spherical bearing surface 6a, in the dividing plane 14 of the socket half 5a, is surrounded by a stepped-down recess 8, whose width corresponds to the diameter of the rollerlike appendage 3 of the head 1. A threaded hole 9 is situated between the recess 8 and the shaft 4 to receive a screw 10 (FIG. 7) provided with a recessed-hexagon head. This screw 10 serves to fasten the two socket-halves 5a and 5b together.

Referring to FIGS. 5 and 6, the upper socket half part 5a has a bearing surface 6b, corresponding to the bearing surface 6a, for the head 1, and has a mouthlike opening 7b (FIG. 6) that corresponds to the opening 7a. The opening angles of the opening 7b, in the horizontal and vertical directions, correspond to those of the opening 7a. In addition, rim parts 11 are disposed peripherally about the bearing surface 6b which rim parts 11 are raised with respect to the dividing plane 14. These rim parts 11, upon assembly of the prosthesis, engage in the recess 8 of the lower part 5a and are spaced apart so that two diametrically opposite slitlike guideways 12 (FIG. 7) are formed. Each guideway 12 has in the dividing plane 14, at both sides of their middle axis perpendicular to the middle axis of the opening 7, an opening angle that is somewhat smaller than the opening angle of the mouthlike opening 7 in the horizontal direction, so that the appendages 3 at the rim parts 11 come to abut before the shaft 2 contacts the delimitation of the opening 7.

The guideways 12 are of a height adapted to the diameter of the appendages 3 (FIGS. 1 and 2) so that the appendages 3 can slide in the peripheral direction and turn round the diameter of the head 1 passing through them. As described above, rotation of the head 1 about the axis passing through the shaft 2 is prevented by means of the appendages 3 set in the guideways 12. It is of course possible to provide the head 1 with only one appendage 3, and the socket 5 with only one guideway 12. Also, any other suitable means for preventing rotation of the head 1 within the socket 5 about an extended axis of the shaft 2 can also be used.

The half part 5b has a hole 13 with an enlarged outside to take the head of the screw 10 and makes it possible for this screw 10 to pass through the upper part 5b. Thus, a detachable connection of the upper and lower parts of the ball-socket 5 is effected through screwing the screw 10 into the threaded hole 9 in the lower part 5a.

As indicated in FIG. 7, the mouth-like openings 7a, 7b through which the shaft 2 passes permit pivoting of the shaft 2 and head 1 into perpendicular planes for each position of the shaft 2 within the openings 7a, 7b. As shown, the openings 7a, 7b are substantially V-shaped in the common plane between the two half parts 5a, 5b.

With respect to the arrangement of the prosthesis relative to the bones in which the prosthesis is implanted it is of course possible to reverse things, so that the head is then held in the arm and the socket is held in a middle hand-bone.

The invention thus provides a wrist joint prosthesis which simulates as closely as possible the natural movements of a wrist and which requires a minimal amount of bone removal in order to be implanted.

We claim:

1. An endo-prosthesis for a wrist joint comprising a spherical head; a shaft attached to and extending from said head; a spherical socket receiving said head therein, said socket having two half parts detachably mounted with respect to each other about said head and a common plane, each said part having a central hemispherical bearing surface, and a mouthlike opening at an edge thereof for passage of said shaft to permit pivoting of said shaft and said head in two perpendicular planes for each position of said shaft within said opening, said opening being substantially V-shaped in said common plane and defining a first angle in a plane parallel to said common plane to permit pivoting of said shaft in said common plane and a second angle in a plane perpendicular to said common plane to permit pivoting of said shaft perpendicularly of said common plane, and means for preventing rotation of said head within said socket about an extended axis of said shaft.

2. An endo-prosthesis as set forth in claim 1 wherein said means includes at least one appendage extending from said head in perpendicular relation to an axis passing centrally through said head, socket and openings and a slitlike guideway in said socket receiving said appendage therein, said guideway being sized to permit slidable movement of said appendage therein in a plane between said parts and rotation of said appendage therein.

3. An endo-prosthesis as set forth in claim 2 wherein one of said half parts of said socket includes a peripheral recess therein and the other of said parts includes a means received in said recess to define said guideway within the plane of said recess.

4. An endo-prosthesis as set forth in claim 2 wherein one of said half parts of said socket includes at least one abutment defining a peripheral extremity of said guideway.

5. An endo-prosthesis as set forth in claim 4 wherein said abutment is a peripheral rim part received in a peripheral recess in the other half part of said socket.

6. An endo-prosthesis as set forth in claim 2 wherein said mouthlike openings define a first angle and said guideway defines a second angle smaller than said first angle within the plane of said first angle.

7. An endo-prosthesis as set forth in claim 2 wherein said appendage is a circular cylinder.

8. An endo-prosthesis as set forth in claim 2 wherein said appendage is spherical in shape.

9. An endo-prosthesis as set forth in claim 1 wherein said socket includes a second shaft extending from said parts at a point diametrically opposite from said openings.

10. An endo-prosthesis as set forth in claim 9 wherein said head includes at least one appendage extending therefrom in perpendicular relation to said first shaft and wherein said socket includes a slitlike guideway disposed in parallel to said second shaft and receiving said appendage therein in rotating and in slidable relation whereby said first shaft is relatively movable transversely of the plane of said second shaft and transversely within said openings.

11. An endo-prosthesis as set forth in claim 1 wherein said first angle is approximately 20° and said second angle is approximately 70°.

* * * * *